United States Patent [19]

Kim et al.

[11] Patent Number: 5,602,064
[45] Date of Patent: Feb. 11, 1997

[54] METHOD OF PRODUCING MICROWAVE DIELECTRIC

[75] Inventors: Jae B. Kim; Suk J. Yun; Hyun J. Kim, all of Seoul, Rep. of Korea

[73] Assignee: L.G. Electro-Components Ltd., Rep. of Korea

[21] Appl. No.: 552,708

[22] Filed: Nov. 3, 1995

[30] Foreign Application Priority Data

Nov. 4, 1994 [KR] Rep. of Korea ................. 94-28902

[51] Int. Cl.$^6$ .............................. C04B 35/46; C04B 35/49
[52] U.S. Cl. ............................................ 501/134; 264/61
[58] Field of Search ................................ 501/134; 264/61

[56] References Cited

PUBLICATIONS

Kingery et al, Introduction to Ceramics, John Wiley & Sons, (entire document) 1976.
Li et al, CA 104:27137 "The change of temperature . . ."1985.

*Primary Examiner*—David Brunsman
*Attorney, Agent, or Firm*—Fish & Richardson P.C.

[57] ABSTRACT

A method of producing a microwave dielectric applicable to microwave applied appliances. According to the method, the temperature coefficient of the resonance frequency of the dielectric is controlled by adjusting the amount of an amorphous portion of the dielectric with quenching of the dielectric material in a temperature range where its liquid phase exists.

1 Claim, No Drawings

METHOD OF PRODUCING MICROWAVE DIELECTRIC

BACKGROUND OF THE INVENTION

1. Field of the Invention

The present invention relates to a method of producing a microwave dielectric for use in a very high frequency (300 MHz~30 GHz) filter, a voltage-controlled oscillator, a global positioning system antenna, etc. More particularly, the present invention relates to a method of producing a microwave dielectric which can achieve temperature compensation for the applied circuities by controlling the temperature coefficient of the microwave dielectric such as a paraelectric.

2. Description of the Prior Art

A microwave dielectric including $TiO_2$ was first developed by Richtmyer in 1939. However, it has not been in practical use since $TiO_2$ has a high temperature coefficient ($\approx$450 ppm/° C.) of the resonant frequency. Accordingly, there have been efforts to improve its characteristics by developing its new compositions and manufacturing processes. For instance, Zr of $ZrTiO_4$ system was replaced by Sn to stabilize its irregular high-temperature phase even at a normal temperature and to arrange its temperature coefficient to reach almost Zero. [Elsevier Applied Science, Electronic Ceramics, pp. 76–78 (1991)]. Meanwhile, the temperature coefficient of a microwave dielectric was controlled by forming secondary phases having a polarity opposite to that of primary phases by using additives or substitution agents (i.e., if the temperature coefficient of the primary phases is positive, that of the secondary phases will be negative). [Japanese Journal of Applied Physics, Vol. 30, No. 913, pp. 2350–53 (September, 1991); Electronic Ceramics, Vol. 24, No. 124, pp. 4–10 (September, 1993); Journal of American Ceramic Society, 73[6], pp. 1599–605; Journal of American Ceramic Society, 67[4], pp. 1499–605 (1984)].

Generally, the wavelength $\lambda_d$ of the standard wave of a microwave dielectric is almost the same as its diameter. In other words, $\lambda_d \approx D$. The resonance frequency $f_o$ of a dielectric is given by $$f_0 = \frac{c}{\lambda_0}.$$

where C=velocity of light in free space, and $\lambda_0$=wavelength of light in free space. The velocity $V_d$ and the wavelength $\lambda_d$ in a non-magnetic dielectric are given by $$v_d = \frac{c}{\sqrt{\epsilon_r}}, \quad \lambda_d = \frac{\lambda_o}{\sqrt{\epsilon_r}},$$

where $\epsilon_r$=dielectric constant.
Thus, $$f_0 = \frac{c}{\lambda_d \sqrt{\epsilon_r}} \approx \frac{c}{D \sqrt{\epsilon_r}} \quad (1)$$

If the temperature changes, $\epsilon_r$ and D also change, causing $f_o$ to change. The following expression is obtained by differentiating the expression (1) with respect to the temperature T:

$$\frac{1}{f_0} \frac{\partial f_o}{\partial T} = -\frac{1}{D} \frac{\partial D}{\partial T} - \frac{1}{2\epsilon_r} \frac{\partial \epsilon_r}{\partial T} \quad (2)$$

where $\frac{1}{f_o} \frac{\partial f_o}{\partial T}$ = temperature coefficient $TCf$ of resonance frequency, $\frac{1}{D} \frac{\partial D}{\partial T}$ = temperature coefficient $\alpha$ of linear expansion, and $\frac{1}{\epsilon_r} \frac{\partial \epsilon_r}{\partial T}$ = temperature coefficient $TC\epsilon$ of dielectric constant.

Thus, $$TC_f = -(\tfrac{1}{2}TC_{\epsilon\epsilon} + \alpha_L) \quad (3)$$

[Chapman and Hall, Electroceramics, pp. 230–241 (1990)].

If we assume that a sintered body is composed of phases of an i system, the following expression is given by a logarithmic mixture rule, $$\log k = \sum_i V_i \log k_i$$

where k=relative dielectric constant, $V_i$=volume fraction of phase i, and $k_i$=relative dielectric constant of phase i. Differentiating the above expression, we get $$\frac{1}{k} \frac{dk}{dT} = \Sigma V_i \frac{1}{k_i} \frac{dk_i}{dT}$$

$$TC_\epsilon = \Sigma V_i TC_{\epsilon i}$$

Substituting the equation (3) for $TC_\epsilon$, we get $$TC_\epsilon = -2(TC_f + \alpha_L) - 2(TC_f + \alpha_L) = -\Sigma V_i [2(TC_{fi} + \alpha_{Li})] \quad (4)$$

$$\therefore TC_f = \Sigma V_i TC_{fi}$$

[Journal of American Ceramic Society, 73[6], pp. 1599–605 (1990)] from the resultant expression, it appears that the temperature coefficient of the resonance frequency of the dielectric is calculated by summing the temperature coefficient of the resonance frequency of each secondary phase. Accordingly, the entire temperature coefficient can be adjusted by properly mixing the phases having a positive or negative temperature coefficient different from each other, i.e., by properly adjusting the composition rate of the phases.

However, the conventional method of controlling the temperature coefficient of a dielectric as described above has the drawback in that additives or substitution agents should be put in the primary phases in order to create the secondary phases, thereby deteriorating other dielectric characteristics except the temperature coefficient.

SUMMARY OF THE INVENTION

The present invention has been made to overcome the problems involved in the prior art. It is an object of the present invention to provide a method of producing a microwave dielectric which can achieve temperature compensation for the applied circuities by controlling the temperature coefficient of the microwave dielectric without using additives of substitution agents.

In order to achieve the above objects, according to the present invention, there is provided a method of producing a microwave dielectric, which comprises controlling the temperature coefficient of the resonance frequency of the dielectric by adjusting the amount of the amorphous portion of the dielectric by quenching the dielectric material in a temperature range where its liquid phase exists.

According to the description of 'Introduction to Ceramics', pp. 594–595 (John Wiley Sons), it is generally known that the thermal expansion rate of an amorphous body is lower than that of a crystal body because the vibration energy caused by the thermal energy can be absorbed by adjustment of the binding angle or the off-axial vibration mode according to the open structure of the amorphous material. For instance, the linear expansion rate of $SiO_2$ is in the range of 9 to 14 ppm/° C. depending on the direction of expansion, while that of fused silica glass is 0.5 ppm/° C. Thus, the liner expansion rate of $SiO_2$ is 20 to 30 times greater than as that of the fused silica glass.

In case of a microwave dielectric, the temperature coefficient $TC_f$ of its resonance frequency is $TC_f = -\frac{1}{2}TC_\epsilon - \alpha_L$. According to repeated experiments, it was recognized that the temperature coefficient $TC_f$ of the resonance frequency was able to be controlled by adjusting the amount of the amorphous portion (i.e., the liquid phase) of the sintered body or by quenching the dielectric in a temperature range where its liquid phase exists since it was difficult to completely remove the liquid phase during sintering.

As described above, according to the present invention, the amount of the amorphous portion of the dielectric is adjusting and thus the temperature coefficient thereof is controlled only by adjusting the condition of heat treatment without the necessity of adding additives or substitution agents as in the conventional method.

While the present invention has been described herein with reference to the preferred embodiment thereof, it will be understood by those skilled in the art that various changes in form and details may be made therein without departing from the spirit and scope of the invention.

What is claimed is:

1. A method of producing a microwave dielectric, which comprises controlling the temperature coefficient of the resonance frequency of the dielectric by adjusting the amount of an amorphous portion of the dielectric with quenching of the dielectric material in a temperature range where its liquid phase exists.

* * * * *

UNITED STATES PATENT AND TRADEMARK OFFICE
CERTIFICATE OF CORRECTION

PATENT NO.  : 5,602,064

DATED       : February 11, 1997

INVENTOR(S) : Kim, et al.

It is certified that error appears in the above-identified patent and that said Letters Patent is hereby corrected as shown below:

Col. 1, line 39, replace "1499" with --1599--;

Col. 1, line 40, replace "standard" with --standing--;

Col. 2, equation 4 should have hard return after $\alpha_L)$;

Col. 3, line 11 change "liner" to --linear--;

Col. 4, line 3, change "adjusting" to --adjusted--;

Signed and Sealed this

Twenty-seventh Day of October, 1998

Attest:

BRUCE LEHMAN

Attesting Officer

Commissioner of Patents and Trademarks